Oct. 18, 1932.　　　D. D. ROCK　　　1,882,924
SCREW DRIVING MECHANISM
Filed Jan. 13, 1931　　　3 Sheets-Sheet 3

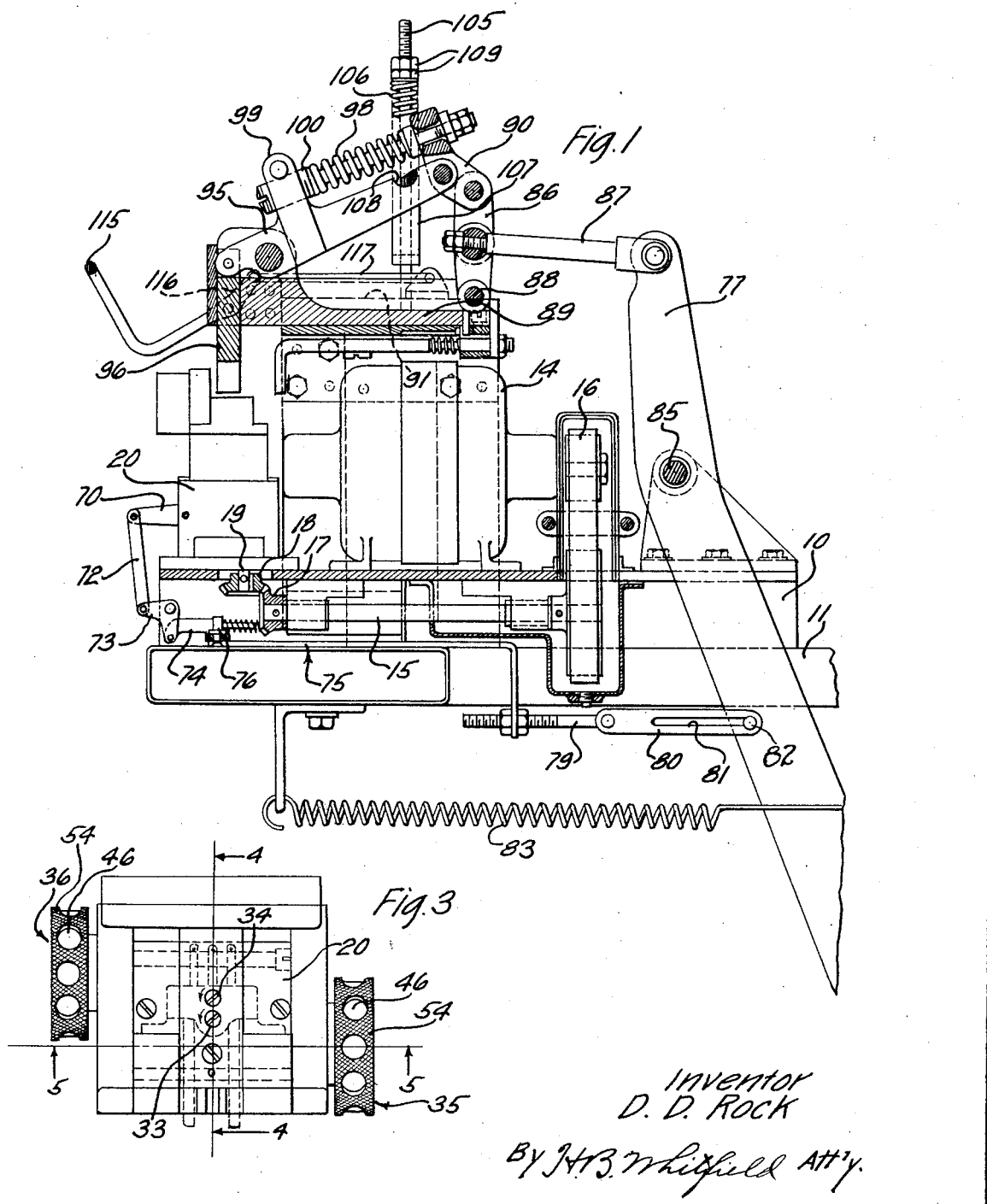

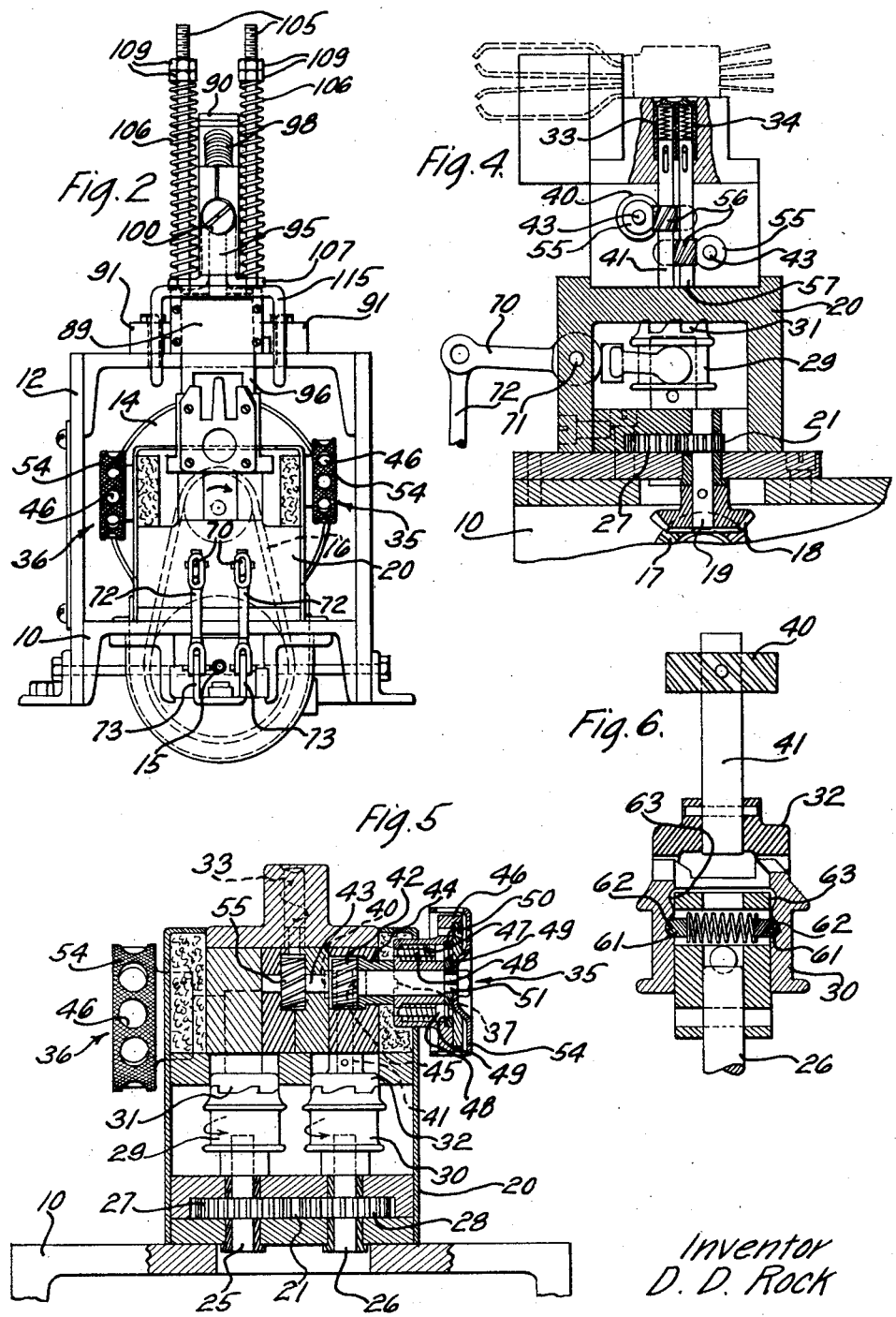

Inventor
D. D. Rock
By E. R. Nowlan Atty.

Patented Oct. 18, 1932

1,882,924

UNITED STATES PATENT OFFICE

DARRELL D. ROCK, OF CICERO, ILLINOIS, ASSIGNOR TO WESTERN ELECTRIC COMPANY, INCORPORATED, OF NEW YORK, N. Y., A CORPORATION OF NEW YORK

SCREW DRIVING MECHANISM

Application filed January 13, 1931. Serial No. 508,482.

This invention relates to a screw driving mechanism, and more particularly to a power driven mechanism for tightening a plurality of the screws simultaneously.

An object of this invention is to provide a simple, efficient, and practical screw driving mechanism for tightening a screw and for indicating the tightening of the screw.

In accordance with the object of the present invention, means is provided for firmly holding screws of an article against resiliently supported rotatable screw driving members, driven through interengaging clutches by power communicated thereto from a motor through overload clutches, each of which is arranged with an exposed member operated synchronously with the driven member of its respective interengaging clutch to indicate engagement of the members of the interengaging clutch, and with an exposed member operated synchronously with one of the screw driving members to indicate an effective or ineffective engagement of the screw driving member with the screw.

The invention will be more fully understood from the following description, taken in connection with the appended drawings, in which Fig. 1 is a vertical sectional view of the apparatus, portions thereof being shown in elevation;

Fig. 2 is a front elevational view of the apparatus;

Fig. 3 is a top plan view of the screw driving unit;

Fig. 4 is a vertical sectional view taken substantially along the line 4—4 of Fig. 3;

Fig. 5 is a vertical sectional view taken along the line 5—5 of Fig. 3;

Figure 6 is an enlarged sectional view of one of the interengaging clutches;

Figure 7:
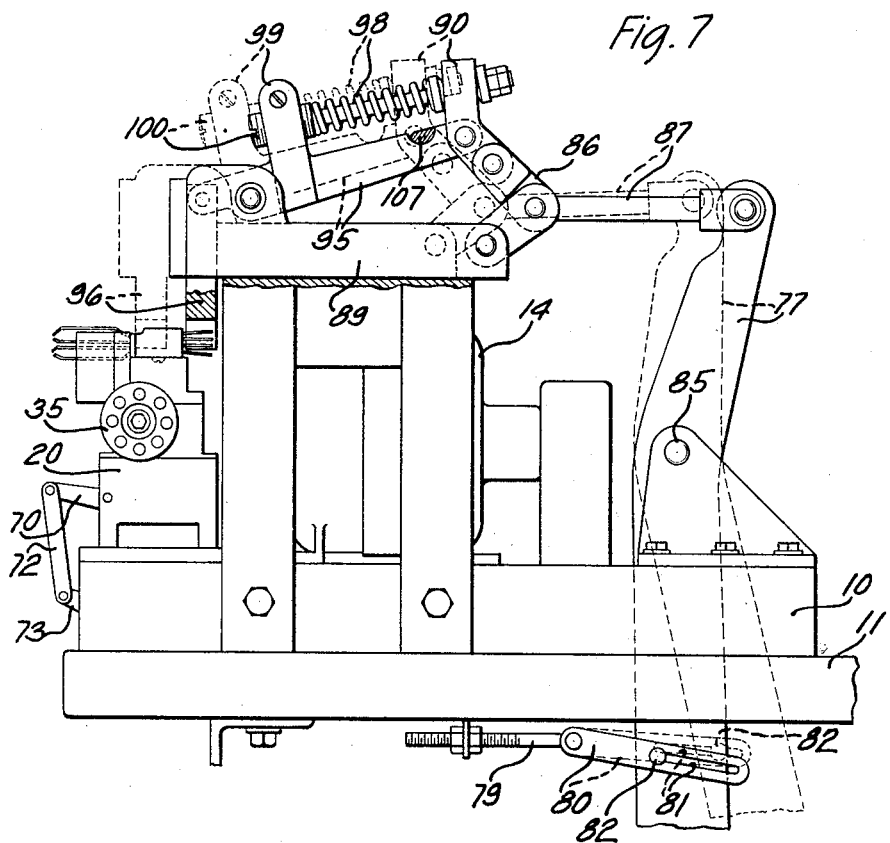
Fig. 7 is a sectional view of the apparatus illustrating different positions of the article clamping means, a set of springs being removed for the purpose of clearness.

Referring now to the drawings wherein like reference numerals designate similar parts throughout the various views, numeral 10 designates a base, mounted upon a suitable support 11 and having a frame 12 secured thereto. Mounted upon the base 10 is a motor 14 (Figs. 1, 2 and 7) operatively connected to a drive shaft 15 by a belt and pulley connection 16, the shaft 15 being journaled in bearings carried by the base 10 and having a beveled gear 17 fixed to the forward end thereof. The beveled gear 17 interengages a similar beveled gear 18 fixed to a shaft 19 journaled in a housing 20 and having mounted thereupon at a position within the housing a pinion 21.

Disposed at spaced positions in the housing 20 are vertically extending clutch shafts 25 and 26 (Fig. 5) having keyed thereto, intermediate their ends, gears 27 and 28, respectively, which interengage the pinion 21 for providing an operative connection between the clutch shafts and the power means. The upper ends of the clutch shafts 25 and 26 have fixed thereto driving members 29 and 30 of interengaging clutches arranged to be moved into engagement with driven members 31 and 32. The driven members 31 and 32 are operatively connected to screw driving members 33 and 34, respectively, through overload clutches indicated generally at 36 and 35, respectively, which are identical in construction and a description of one would apply equally well to them both.

Figure 8:
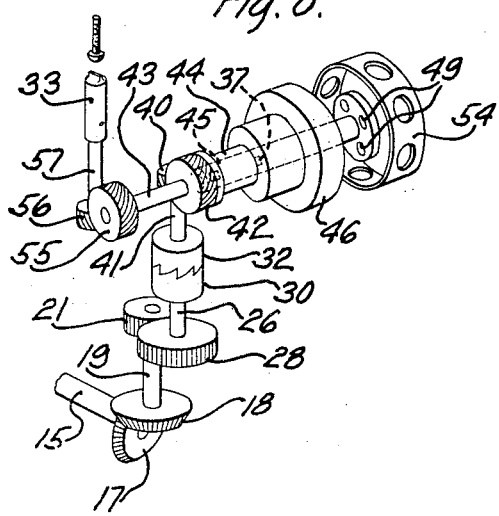
Fig. 8 is a perspective view of one of the indicating units, portions of the mechanism being removed for the purpose of clearness.

Considering the overload clutch 35 shown in section in Fig. 5 and in perspective in Fig. 8, there will be found a spiral gear 40 mounted upon a shaft 41 of the driven member 32 and interengaging the spiral gear 42 freely rotatable upon a horizontal shaft 43. A sleeve 44 is disposed concentric with an enlarged portion of the shaft 43 and has projecting lugs 45 receivable in recesses in the spiral gear 42 for interlocking the sleeve with the spiral gear. An inner indicating member 46 is rotatably mounted upon the enlarged portion of the shaft 43 and similarly connected to the sleeve 44 by projecting lugs 37 of the sleeve being disposed in recesses in the adjacent wall of the inner indicating member. At spaced positions in the inner indicating member 46 are recesses 47 in which spring pressed connecting pins 48 having conical shaped ends are disposed. The conical shaped ends of the connecting pins 48 are receivable in similarly shaped depressions 49 in a collar 50 which is mounted upon and secured to a squared portion 51 of the shaft 43. An outer indicating member 54 having spaced apertures in the peripheral wall thereof adjacent the peripheral wall of the inner indicating member 46 is mounted upon the squared portion 51 of the shaft 43 and secured in place by any suitable means such as a nut. Mounted upon the inner end of the shaft 43 is a spiral gear 55 interengaging a spiral gear 56 of a vertically extending shaft 57 on the upper end of which the screw driving member 33 is resiliently mounted.

In a similar manner the interengaging clutch consisting of the driving member 29 and the driven member 31 operatively connects the other screw driving member 34 to the power means through the overload clutch 36.

The driving members 29 and 30 of the inter-engaging clutches have spring pressed pins 61 receivable in recesses 62 for holding the driving members in operative engagement with the driven members and recesses 63 for receiving the spring pressed pins 61 for holding the driving members out of operative engagement with the driven members (Fig. 6). The mechanism for actuating the driving portions 29 and 30 for moving them into and out of operative engagement with the driven members 31 and 32 consists of forked levers 70 (Figs. 1, 2 and 5) pivotally mounted at 71 in the housing 20 and having their forked ends positioned in engagement with annular spaced projections of the driving members. The outer ends of the levers 70 are connected by links 72 to ends of the bell crank levers 73 which are pivotally mounted upon the base 10 and have their other ends pivotally secured to a spring cushioned arm 74. A pull rod 75 has one end operatively connected to the arm 74 as at 76 and the other end adjustably secured to an actuating lever 77 by an adjustable member 79. A link portion 80 of the adjustable member 79 has an elongated aperture 81 for receiving a bolt 82 or the like carried by the actuating lever 77. A spiral tension spring 83 normally urges the lower portion of the actuating lever 77 forwardly, the lower portion of the lever being operatively connected to a foot pedal (not shown). The actuating lever 77 is pivoted at 85 and has its upper end operatively connected to a toggle lever 86, at the central pivot thereof, by a connecting link 87. The lower end of the toggle lever 86 is pivoted at 88 upon a carriage 89, while the upper end is pivotally secured to an upper lever 90. The carriage 89 is movably carried by the frame 12 and held against displacement by track or guide members 91 mounted upon the frame and extending over outwardly projecting portions of the carriage. Adjacent the forward end of the carriage 89 a positioning lever 95 has one end pivotally secured to a holding member 96, which is slidable vertically in the carriage 89, and has the other end pivotally secured to the upper toggle lever 90 at a point intermediate its ends. A spiral compression spring 98 positioned between the upper end of the upper toggle lever 90 and upwardly extending integral projections 99 of the lever 95 provides a cushioning means, hereinafter described, the relative position and the tension of the spring being variable by varying the position of an adjustable rod 100 upon which the spring is disposed. Vertically extending adjusting rods 105 positioned upon each side of the lever 95 and having their lower ends fixed to the carriage 89, have spiral compression springs 106 disposed concentrically therewith, the lower ends of the springs abutting a connecting member 107 which extends up and over the lever 95 at a concave recess 108 therein and the upper ends of the springs abutting adjusting nuts 109 mounted upon the upper ends of the rods 105.

A guard 115 (Figs. 1 and 2) is pivotally mounted upon the carriage 89 and has a projecting portion 116 connected by the aid of a link 117 to a stationary bracket fixed to one of the guides 91.

The upper portion of the housing 20 is cut away to receive the article containing the screws which are to be tightened. The construction of the upper portion of a housing depends upon the article which is to be operated upon. In the present instance the housing is formed to accommodate a sequence switch unit having outwardly flared portions of a bracket to which a plurality of switch members are secured by means of screws.

During the operation of the apparatus the motor 14 is energized, thus causing a continuous rotation of the driving members 29 and 30 of the interengaging clutches. When the article has been disposed in the upper portion of the housing 20, so that the heads of the screws thereof are adjacent the screw driving members 33 and 34, the actuating lever 77 is moved against the tension spring 83 (Fig. 1) so as to move the carriage 89 forwardly, from its normal position shown in solid line to the position shown in dotted lines in Fig. 7, where the holding member 96 abuts the projecting portions of the article to position properly the screws thereof in general alignment with the screw driving members. The springs 106 hold the rearward end of the lever 95 downwardly and hold the member 96 upwardly until the carriage reaches its foremost position. During the forward movement of the carriage the guard 115 is swung upwardly to remove the operator's hand from the movable parts and avoid injury to the operator which might occur if his hand were allowed to remain near the movable parts during the actuation of the apparatus. After the carriage has reached the extent of its forward movement, a further movement of the actuating lever 77 will move the portions of the toggle lever 86 into substantially aligned positions to move the lever 95 against the tension of the springs 106 and move the holding member 96 downwardly (Fig. 1), forcing the screws of the article into close engagement with the screw driving members 33 and 34.

The actuation of the lever 77 also moves the driving members 29 and 30 of the interengaging clutches into operative engagement with the driven members 31 and 32, respectively, and causes rotation of the spiral gears 40 and 42, the sleeves 44, and the inner indicating members 46. The spring pressed pins 48 provide a frictional engagement between the inner indicating members 46 and the collars 50 which are fixed to the shafts 43 and cause the rotation of the shafts and the outer indicating members 54. Due to the operative engagement of the shafts 43 with the screw driving members 33 and 34, these members will be rotated in the direction of the arrows (Fig. 3). The resilient supports for the screw driving members 33 and 34 permit the screw driving members to engage properly the screws of the article and to tighten the screws.

The indicating members 46 and 54 being positioned where the operator may readily observe them while actuating the lever 77 enables the operator to determine whether or not the driving members 29 and 30 are engaging the driven members 31 and 32, respectively, and whether or not the screw driving members 33 and 34 are properly engaging the screws. Furthermore, the sets of indicating members are positioned, one forwardly and one rearwardly, to indicate to the operator which interengaging clutch or which screw driving member is effective, if such may be the case. For example, let it be assumed that the slot of the foremost screw is not positioned in the center of the head or that the head has been battered slightly so that the screw driving member 33 cannot properly engage the screw, the screw driving member 33 will continue to rotate during the engagement of the clutch members 30 and 32, thus rotating the outer indicating member 54. This will indicate to the operator that a proper connection does not exist between the screw driving member 33 and the screw disposed adjacent thereto. When the screw driving member 33 properly engages the screw disposed adjacent thereto, the outer indicating member will be rotated for a portion of a revolution and will then be abruptly stopped and held against rotation, during the actuation of the inner indicating member 46, for the reason that it is held inoperative by the screw driving member 33 which has rotated sufficiently to tighten the screw and is held against further rotation by the screw.

It is important that the operator know, during each operation, whether or not there is an effective connection between the power means and the screw driving members. For example, if something should occur to prevent an operative engagement between the power means and the screw driving members, which was not otherwise obvious to the operator, the outer indicating members would cease to rotate and the operator might well assume that the screws in the article were properly tightened. For this reason, the inner indicating members are rotated as long as there remains an operative connection with the power means. Therefore, the inner indicating member 46 of the unit 35 indicates the engagement of the clutch members 30 and 32, the inner indicating member 46 of the unit 36 indicates the operative engagement of the clutch members 29 and 31, while the outer indicating members 54 of the units 35 and 36 indicate the operative connection of the screw driving members 33 and 34, respectively, with the power means.

Although the invention has herein been described in connection with one particular type of article, it is to be understood that the invention may be applied to different articles for accomplishing a similar result without departing from the spirit and scope of the invention.

What is claimed is:

1. In a screw driving mechanism, a screw driving member, a stationary housing surrounding said screw driving member, means for actuating said screw driving member, means for moving an object into engagement with and holding the object in engagement with said screw driving member, and means disposed laterally of said screw driving member and externally of said housing for visually indicating an operative engagement between said screw driving member and said object.

2. In a screw driving mechanism, a plurality of screw driving members, a stationary housing surrounding said screw driving members, means for actuating each of said screw driving members, and means disposed externally of said housing for indicating an effective or ineffective actuation of each set of screw driving members.

3. In a screw driving mechanism, a plurality of screw driving members, a stationary housing surrounding said screw driving members, means for positioning screws of an object adjacent said screw driving members, and means disposed externally of said housing for indicating an effective or ineffective connection of each of said screw driving members with the screws.

4. In a screw driving mechanism, a plurality of actuating members, a plurality of screw driving members, a stationary housing surrounding said screw driving member, means for operatively connecting said screw driving members with said actuating members, and means disposed externally of said housing and including overload clutches for indicating an effective or ineffective connection of each of said screw driving members with said actuating members.

5. In a screw driving mechanism, a power means, a driving clutch member operatively connected to said power means, a driven clutch member arranged to engage said driving clutch member, an inner indicating member operatively connected to said driven clutch member and rotatable therewith for visually indicating the operative connection thereof with the driving clutch member, a screw driving member, an outer visual indicating member, and means for operatively connecting said screw driving member with said driven clutch member and with said outer indicating member for effecting a simultaneous actuation of said screw driving member and said outer indicating member.

6. In a screw driving mechanism, an inner indicating member, an outer indicating member having apertures in the periphery thereof adjacent said inner indicating member, power means including a clutch for actuating said inner indicating member when said clutch is engaged, a screw driving member, and means for operatively connecting said screw driving member and said outer indicating member for said power means.

7. In a screw driving mechanism, an outer indicating member having apertures in the periphery thereof, an inner indicating member disposed in said outer indicating member and visible through said apertures, a screw driving member operatively connected to said outer indicating member and rotatable therewith, power means including a clutch for rotating said inner indicating member when said clutch is engaged, and spring pressed means for frictionally connecting said screw driving member and said outer indicating member to said power means for indicating the actuation of said screw driving member.

8. In a screw driving mechanism, a power means including a connecting clutch, a shaft, an inner indicating member rotatably mounted upon said shaft, means for operatively connecting said inner indicating member to said clutch and said power means, frictional engaging means for operatively connecting said inner indicating member to said shaft, an outer indicating member fixedly mounted upon said shaft, and a screw driving member operatively connected to said shaft and rotatable with said outer indicating member when said shaft is rotated.

9. In a screw driving mechanism, power means including a connecting clutch, a shaft, an outer indicating member having apertures therein fixedly mounted upon said shaft, an inner indicating member rotatably mounted upon said shaft and visible through said apertures, means for operatively connecting said inner indicating member with said clutch and said power means, a recessed member fixedly mounted upon said shaft, spring pressed members carried by said inner indicating member and arranged to be held in frictional engagement of said recessed member for frictionally connecting said inner indicating member with said shaft, and a screw driving member operatively connected to said shaft and rotatable with said outer indicating member, the outer indicating member indicating the actuation of said screw driving member and said inner indicating member indicating the connection of said clutch with said power means.

10. In a screw driving mechanism, a screw driving member, means positioned adjacent said screw driving member for receiving an article having a screw to be tightened, a positioning member arranged to engage the article, and means for actuating said positioning member for moving the article to position the screw in alignment with said screw driving member and then moving the article to move the screw into registration with said screw driving member.

11. In a screw driving mechanism, a housing, a screw driving member rotatably disposed in said housing, an indicating element positioned externally of said housing and having its axis extending transversely relative to the axis of said screw driving member, and means for operatively associating said indicating element with said screw driving member for indicating whether or not the screw driving member is rotating.

12. In a screw driving mechanism, a housing, a screw driving member rotatably disposed in said housing, an indicating element positioned externally of said housing, a second indicating element disposed externally of said housing, power means for actuating said screw driving member, means for effecting an operative connection between said power means and said first indicating element, the actuation of said first indicating element indicating when said connection is effective, and means for operatively connecting said first indicating element to said second indicating element for actuating said screw driving member, said second indicating element indicating whether or not said screw driving member is rotating.

13. In a screw driving mechanism, a rotary screw driving device, a rotary indicator disposed laterally of said device, and means for driving said device and indicator comprising an overload clutch, whereby failure of said indicator to cease rotating indicates failure of said device to drive a screw.

14. In a screw driving mechanism, a housing, a screw driving member rotatably disposed in said housing, means carried by said housing for receiving an article having a screw to be tightened, an abutting member, and means for moving the article into intimate engagement with said abutting member to position the screw in alignment with said screw driving member and for moving the article toward said screw driving member to move the screw into engagement therewith.

15. In a screw driving mechanism, a rotatable screw driving member, an abutting member disposed adjacent said screw driving member, a movable carriage, a positioning member movably carried by said carriage, and means operatively connected to said carriage and to said positioning member for moving said carriage with said positioning member in one direction so that said positioning member may move an article in engagement with said abutting member and thereafter move said positioning member toward said screw driving member to move a screw of the article into engagement with said screw driving member.

In witness whereof, I hereunto subscribe my name this 31st day of December, A. D. 1930.

DARRELL D. ROCK.